United States Patent [19]

Sky-Eagle, Jr.

[11] 3,757,953
[45] Sept. 11, 1973

[54] DECANTING SKIMMER
[76] Inventor: William A. Sky-Eagle, Jr., 1038 Meadowbrook Dr., Corpus Christi, Tex. 78412
[22] Filed: May 26, 1972
[21] Appl. No.: 257,283

[52] U.S. Cl.......................... 210/242, 210/DIG. 21
[51] Int. Cl............................................ E02b 15/04
[58] Field of Search................ 210/83, 242, DIG. 21

[56] References Cited
UNITED STATES PATENTS

| | | | |
|---|---|---|---|
| 3,708,070 | 1/1973 | Bell.................................... | 210/242 |
| 3,476,038 | 11/1969 | Dicmas........................... | 210/242 X |
| 3,688,506 | 9/1972 | Marcocchio....................... | 210/242 |
| 3,615,017 | 10/1971 | Valdespino......................... | 210/242 |
| 3,630,376 | 12/1971 | Price.................................. | 210/242 |
| 3,237,774 | 3/1966 | Schuback.......................... | 210/242 |
| 3,670,896 | 1/1971 | Hale, Jr. ...................... | 210/DIG. 21 |
| 1,591,024 | 7/1926 | Dodge................................ | 210/242 |
| 2,608,300 | 8/1952 | Small.................................. | 210/242 |

Primary Examiner—Samih N. Zaharna
Assistant Examiner—T. A. Granger
Attorney—Richard K. Stevens, Clelle W. Upchurch et al.

[57] ABSTRACT

An apparatus for skimming oil or other scum from the surface of water, has floats supporting a sump tank with a weir at its forward end, means for pivoting the sump around a transverse axis to adjust the depth of the weir below the surface of the water and pumping means for withdrawing liquid collected in the sump.

4 Claims, 6 Drawing Figures

Patented Sept. 11, 1973

DECANTING SKIMMER

This invention relates generally to a device for skimming scum from the surface of a body of water and more particularly to an apparatus adapted for skimming oil slicks from the surface of a body of water.

Various types of floating skimming apparatus have been proposed before. One apparatus of this type is disclosed in U.S. Pat. No. 3,237,774. The disclosed apparatus has a collecting tank suspended between floats on gimbals. A skimming bailer 10 having a substantially flat bottom and an open end skims oil from the surface of water and carries it to the submerged collecting tank. The suspended tank is free to move up and down with the water. The apparatus is not provided with any means for adjusting its elevation except by changing the ballast in its floats.

It is an object of this invention to provide an apparatus for decanting scum from the surface of water. Another object of the invention is to provide an improved apparatus for skimming oil from the surface of water and for withdrawing the oil from the apparatus. A more specific object of the invention is to provide an apparatus for skimming oil from the surface of water which can be accurately adjusted to the optimum skimming depth and maintained at the selected depth as it is moored or anchored at the vortex of stationary spill booms deployed in a V configuration or as it is towed over a body of water.

Other objects will become apparent from the following description with reference to the accompanying drawing wherein.

Figure 1:
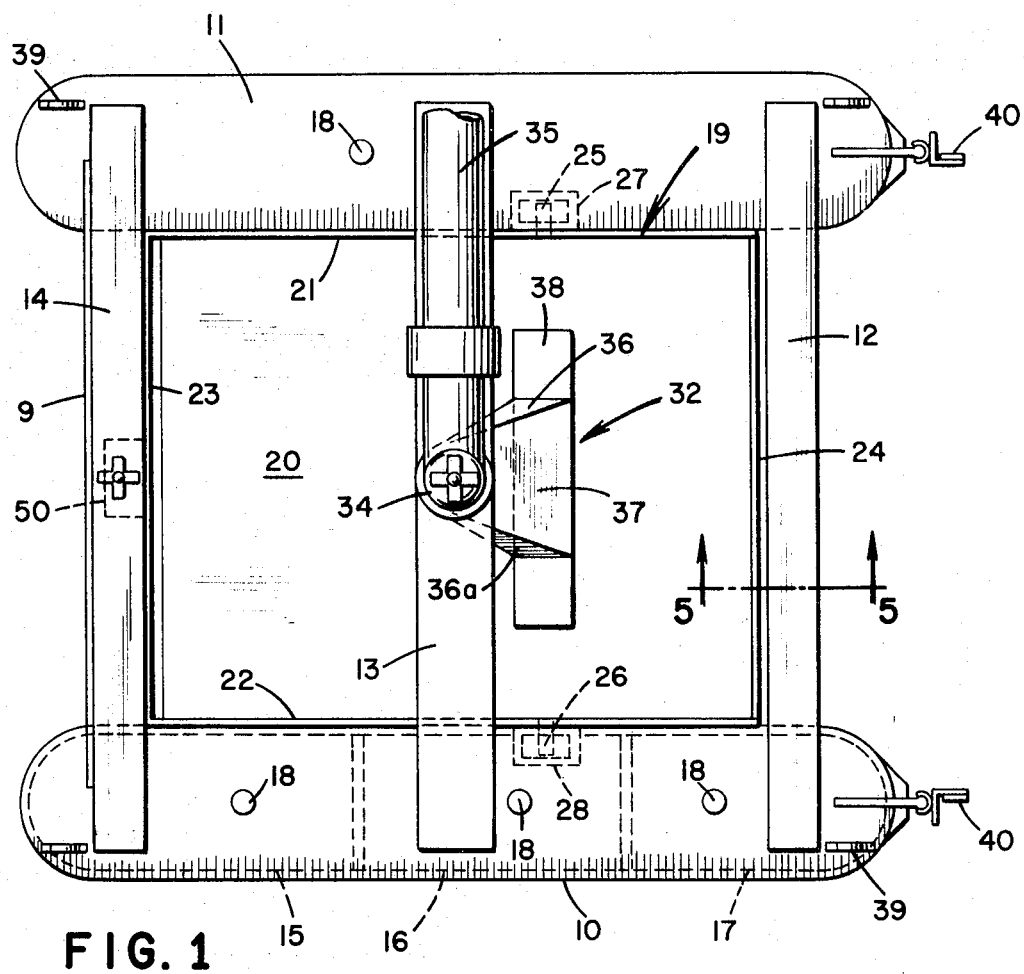
FIG. 1 is a plan view of one embodiment of the invention.

The foregoing objects and others are accomplished, generally speaking, by providing an apparatus having a sump tank disposed between a pair of floats and having a weir at its forward end and means for adjusting the elevation of the weir to an optimum skimming depth. The height of the forward wall of the sump is less than the height of its sidewalls and rear wall to provide a weir over which the oil on the surface of a body of water will flow as the apparatus is towed. The skimming apparatus may be secured at the vortex of two spill booms towed by their opposite ends to provide means for guiding an oil slick over the weir but it is preferably moored or anchored in the path of a slick being moved by water currents or wind action. Stationary spill booms may be deployed in a V configuration with the anchored or moored skimmer at the vortex. The apparatus thus combines an oil sump pivotally suspended between a pair of laterally spaced floats or pontoons, a suction head in the sump and communicating with pumping means through a control valve to a suitable storage means such as a barge for the oil. Two pivot points on opposite sides of the sump having their common centerline parallel to the edge of the weir permit the weir to adjust and skim the floating oil from the water. This allows the oil to collect in the sump from where the pump, through the suction head, withdraws the oil. The pump then forces the oil through the discharge line to a storage barge from where the oil may be taken to the shore.

Referring now to the drawing, the illustrated embodiment of the invention has laterally spaced pontoons 10 and 11 suitably joined together and maintained in their spaced relationship by longitudinally spaced structural members or bars 12, 12a, 14 and 14a. These structural members may be welded, bolted or otherwise secured at their ends to the pontoons 10 and 11. A bridging member 13 provides a platform and a support for a valve 34 and conduits 33 and 35. A plate 9 spans the space between pontoons 10 and 11 and preferably extends from member 14a to member 14.

Pontoons 10 and 11 may be divided into compartments by bulkheads 15, 16 and 17 as shown in pontoon 10 or they may be a single chambered elongated substantially cylindrical structure as shown in pontoon 11. The ends of the pontoons 10 and 11 may have suitably curved ends. Suitably plugged or capped openings 18 may be provided for adding or withdrawing liquid or other ballast from pontoons 10 and 11 in order to obtain proper submersion of the device.

Figure 2:
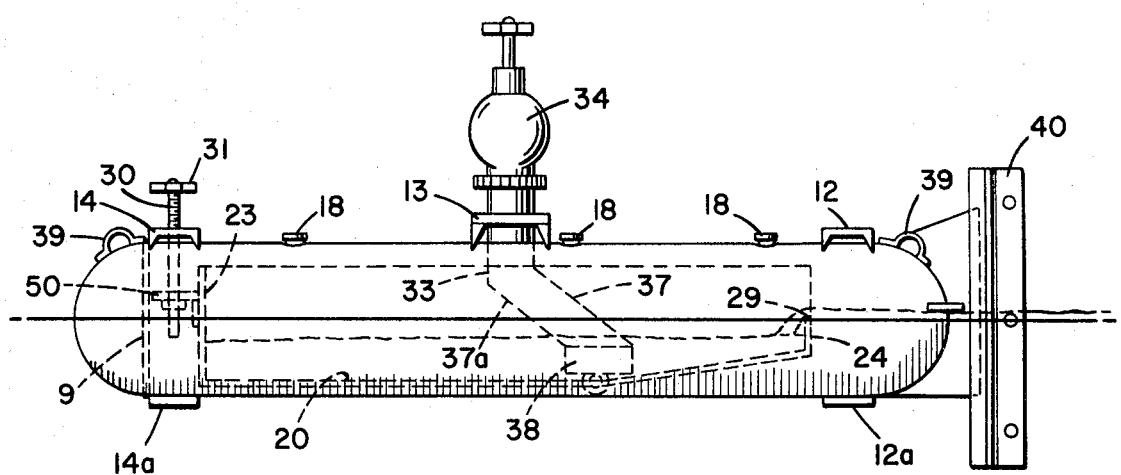
FIG. 2 is a side elevation.
Figure 3:
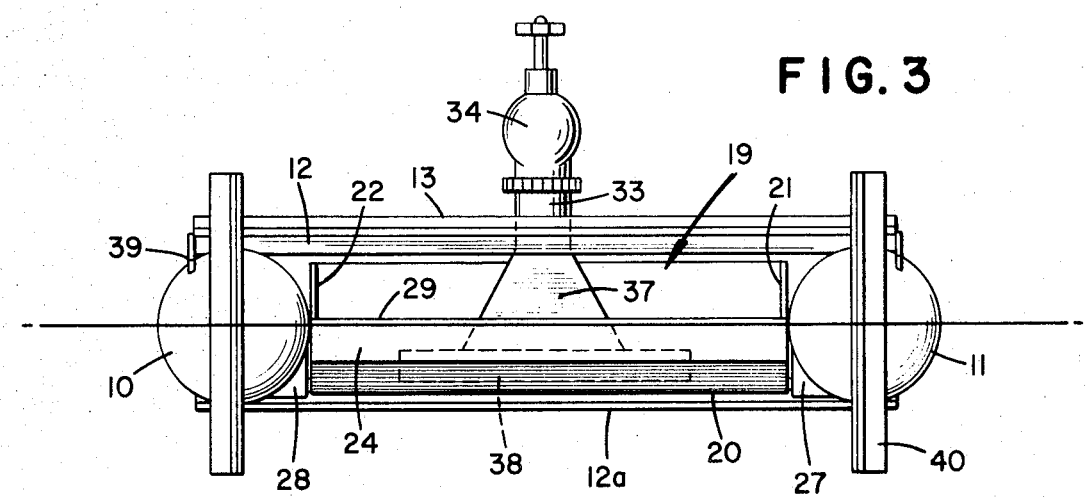
FIG. 3 is a front elevation.
Figure 4:
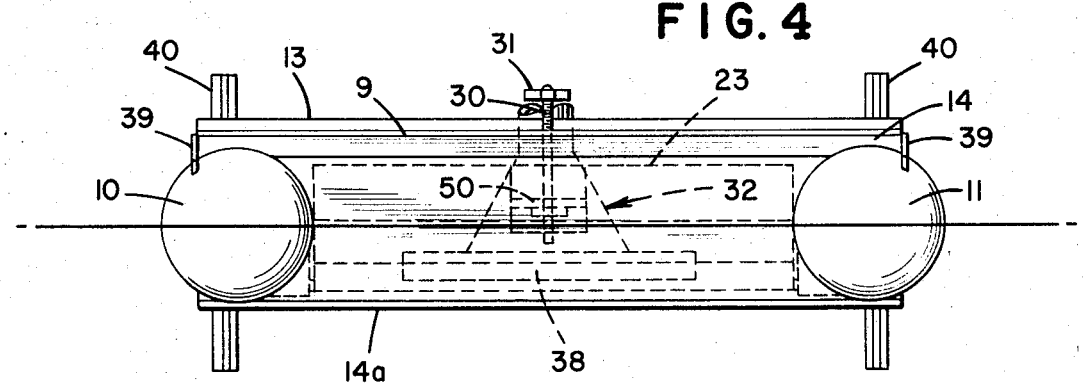
FIG. 4 is a rear elevation.
Figure 5:
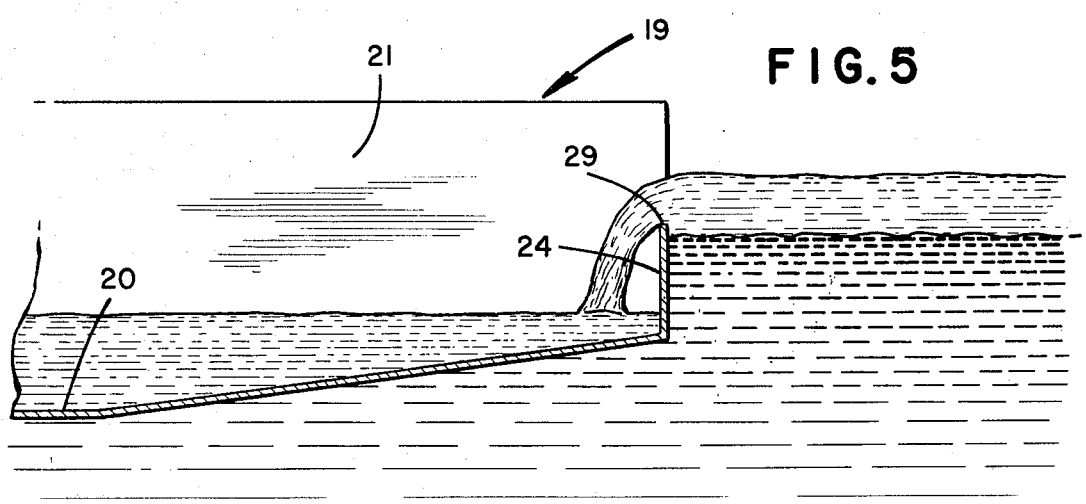
FIG. 5 is an enlarged fragmentary longitudinal section taken along the line 5—5 of FIG. 2.

A rectangularly shaped sump 19 having a bottom 20, side-walls 21 and 22, rear wall 23, front wall 24 and an open top is pivotally disposed by means of trunnions 25 and 26 between pontoons 10 and 11. Suitable frames 27 and 28 for supporting trunnions 25 and 26 may be provided in pontoons 10 and 11. The height of forward wall 24 is less than that of sidewalls 21 and 22 and rear wall 23 and terminates at its upper edge in a weir 29. A weir adjusting screw 30 has a handle 31 above bar 14 and is threadably secured in a bore through a plate 50. Plate 50 is rigidly secured to rear wall 23 and projects rearwardly under bar 14. Adjustment of the length of the shaft of screw 30 below member 14 causes pivoting of sump 19 and elevating or lowering of weir 29. A suction head 32 is connected at its upper end to a conduit 33 which extends upwardly from the well of sump tank 19 through structural bar member 13. A control or regulating valve 34 is disposed between conduit 33 and a second conduit 35 which leads to a barge or other suitable storage means for oil pumped from sump 19. As illustrated in FIGS. 1 and 3 forward and rear walls 36 and 36a of suction head 32 flare outwardly towards sidewalls 21 and 22 from the point where suction head 32 is connected to conduit 33 to provide a frusto-triangular shape in cross-section. Walls 37 and 37a join walls 36 and 36a together and, as illustrated in FIG. 2, slope forwardly towards forward wall 24. Walls 36, 36a, 37 and 37a are joined at their lower edges to a box-like structure 38 having an open bottom through which oil may be pumped from the sump. The open bottom of collector 38 is just above bottom wall 20 to permit removal of substantially all liquid from sump 19 through conduits 33 and 35. As illustrated in FIG. 2, bottom wall 20 slopes upwardly from adjacent trunnion pins 25 and 26 to forward wall 24 to facilitate towing of the skimming device through a body of water.

Figure 6:
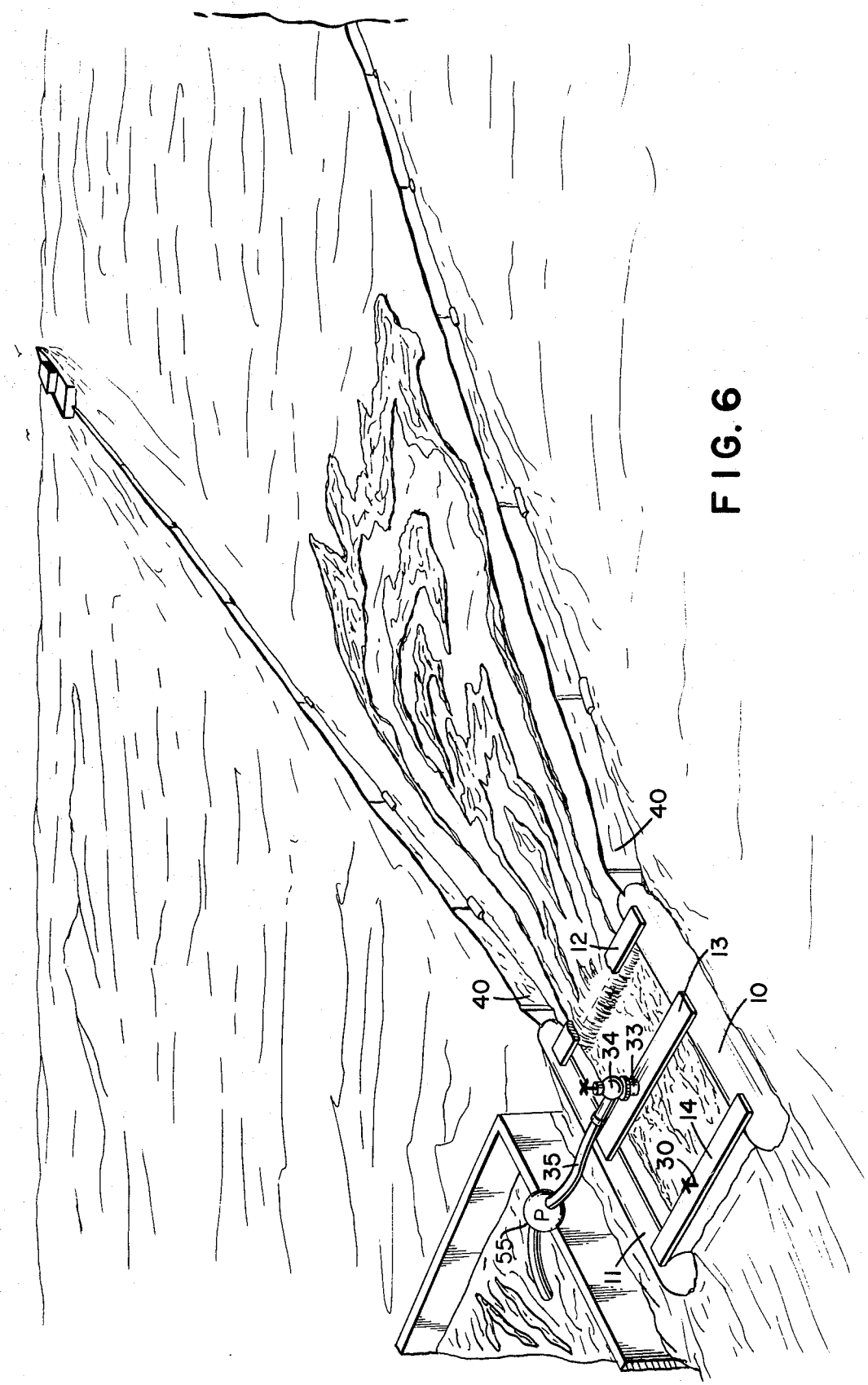
FIG. 6 is a perspective view, partially broken away, illustrating an embodiment of the invention in operation alongside an oil receiving barge.

Rigging loops 39 are provided at the ends of pontoons 10 and 11 for convenience in towing or mooring. As illustrated best in FIGS. 1, 2 and 6 the skimmer may be secured by means of the loops 39 at the forward ends of pontoons 10 and 11 to suitable spill booms 40 towed by boats as illustrated in FIG. 6.

In operation, the decanting skimmer may be moored or anchored in the path of a slick being moved by water currents or wind action. Oil or scum on the surface of the water passes over weir 29 into sump 19. The forward ends of pontoons 10 and 11 may be secured with rigging to nylon or other fabric spill booms 40. Alternately, boats may be attached to the opposite ends of the booms. The boats are spaced laterally from each other to form an outwardly flaring fence. As these booms are towed over a body of water, oil collected therebetween passes over weir 29 into sump 19. The closure plate 9 (FIG. 2) is essential to effect a liquid tight surface structure for containing the liquid or scum being skimmed.

The oil collected in the sump 19 may be pumped by pump 55 continuously from sump 19 into a barge anchored or towed alongside or the decanting operation may be stopped when sump 19 is filled with oil and the oil pumped therefrom to a barge or other storage vessel before skimming is resumed. Valve 34 may be adjusted so that oil is pumped from sump 19 at about the same rate as it is passing over weir 29 to maintain a substantially constant elevation of weir 29 and constant skimming depth with respect to the surface of the body of water. This enables maintenance of a close adjustment of the depth of weir 29 below the liquid surface and avoids passage of excessive volumes of water into sump 29. In other words, the elevation of weir 29 with respect to the surface of the liquid body to be skimmed may be adjusted to the desired point by the ballast in pontoons 10 and 11 and screw 30 to maintain a constant skimming depth. Then valve 34 may be adjusted so that the volume of liquid in sump 29 is substantially constant as the skimming device is towed over a body of water. When it is desired to take a deeper or shallower cut, the control valve or the pump speed may be adjusted.

The pontoons or floats may be made of metal, fiberglass reinforced plastic, or any other suitable material. The structural members used to connect the pontoons together and to support the regulating valve and pivot adjusting screw may be wood, metal, plastic or the like. The walls of sump 19 may also be constructed from metal, wood, fiberglass reinforced plastic or the like.

Although the invention has been described in detail for the purpose of illustration it is to be understood that such detail is solely for that purpose and that variations can be made therein by those skilled in the art without departing from the spirit and scope of the invention except as it may be limited by the claims.

I claim:

1. Apparatus for collecting oil from the surface of a body of water, said apparatus comprising:
   a. a pair of longitudinal laterally spaced floats with a rear end and a forward end,
   b. an oil collecting receptacle pivotally secured between said floats constructed and arranged for rotational movement between said floats around an axis at right angles to the longitudinal axis of said floats, said receptacle comprising an open top, a rear wall, sidewalls, a bottom wall, and a forward wall, said forward wall having a height less than the sidewalls and rear wall whereby an inlet is provided into said receptacle, said bottom wall being generally horizontal at the normal operating attitude of the receptacle from said rear wall forwardly to the point where means pivotally secure the receptacle to the floats and inclined upwardly from said point forwardly thereof until it is connected to the forward wall,
   c. means for preventing flow of oil through the apparatus between the receptacle and floats,
   d. means for removing oil from said receptacle, said means comprising a conduit with a first open end within the receptacle and above the bottom thereof and a second open end, a pump for withdrawing collected oil in communication with means for receiving the collected oil from the said second open end, and means between said open ends of the conduit for adjusting flow of oil through the conduit whereby the rate of removal of oil from said rceptacle may be controlled to thereby adjust the weight of oil within the receptacle which weight causes rotation of said receptacle around its pivotally securing means variably positioning the upper edge of said forward wall relative to the surface of said body of oil and water.

2. The apparatus of claim 1 wherein said first open end of said conduit is an elongate opening with a long axis parallel to the axis around which said receptacle rotates.

3. The apparatus of claim 1 having adjustable means at the rear wall of said receptacle for limiting the horizontal movement of said receptacle around the axis about which it rotates.

4. The apparatus of claim 1 in combination with two booms floating on the surface of said body of water and with a first end of each boom connected to the forward end of each longitudinal float and the second ends of each boom extending forwardly there-from.

* * * * *